(12) United States Patent
Moon

(10) Patent No.: US 8,059,620 B2
(45) Date of Patent: Nov. 15, 2011

(54) INITIATION OF ROUTING CONVERGENCE BY A MOBILE ROUTER IN A MOBILE AD HOC NETWORK IN RESPONSE TO REACHING A MINIMUM INTERVAL OF STABLE RELATIVE PROXIMITY BETWEEN AT LEAST ONE NEIGHBOR

(75) Inventor: Billy Gayle Moon, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 749 days.

(21) Appl. No.: 11/494,584

(22) Filed: Jul. 28, 2006

(65) Prior Publication Data

US 2008/0025270 A1   Jan. 31, 2008

(51) Int. Cl.
*H04W 4/00* (2009.01)
(52) U.S. Cl. ........................ 370/338; 709/241
(58) Field of Classification Search .............. 370/338, 370/392; 709/241, 221, 229; 726/22, 34
See application file for complete search history.

(56) References Cited

U.S. PATENT DOCUMENTS

| 7,159,035 | B2 * | 1/2007 | Garcia-Luna-Aceves et al. ............ 709/241 |
| 7,302,704 | B1 * | 11/2007 | Elliott ............ 726/22 |
| 2003/0033394 | A1 * | 2/2003 | Stine ............ 709/222 |
| 2005/0076054 | A1 | 4/2005 | Moon et al. |
| 2005/0090201 | A1 * | 4/2005 | Lengies et al. ............ 455/41.2 |
| 2007/0230410 | A1 * | 10/2007 | Thubert et al. ............ 370/338 |

OTHER PUBLICATIONS

U.S. Appl. No. 11/324,270, filed Jan. 4, 2006, Thubert et al.

Pei et al, "Fisheye State Routing: A Routing Scheme for Ad Hoc Wireless Networks", Proceedings of the IEEE International Conference on Communications, pp. 70-74, New Orleans, LA, Jun. 2000. (Available via World Wide Web at citeseer.ist.psu.edu/article/pei00fisheye.html).

Bush et al., "The Limits of Motion Prediction Support for Ad hoc Wireless Network Performance", The 2005 International Conference on Wireless Networks (ICWN-05) Monte Carlo Resort, Las Vegas, Nevada, USA, Jun. 27-30, 2005, 7 pages, (Available via World Wide Web at arxiv.org/ftp/cs/papers/0512/0512092.pdf).

Carofiglio et al., "Analysis of Route Stability in MANETs", Second EuroNGI Workshop on New Trends in Modelling, Quantitative Methods and Measurements, Aveiro, Portugal, Nov. 2005, 2 pages, (Available via World Wide Web at av.it.pt/eurongi-wp-ia-81/8.pdf).

Oldham, "Mobile Ad hoc Networks for Space and Surface Systems", NASA Glenn Research Center, Jun. 5, 2003, 20 pages (cached copy retrieved from World Wide Web at google.com/search?q=cache:U6Lj3wkhu0sJ:scp.grc.nasa.gov/siw/presentations/Session_D/D_09_Oldham.pdf+D_09_Oldham.pdf.pdf&hl=en&gl=us&ct=clnk&cd=2).

Berry et al., "PPP Over Ethernet (PPPoE) Extensions for Credit Flow and Link Metrics", Internet Draft <draft-bberry-pppoe-credit-05.txt>, Mar. 10, 2004, pp. 1-20.

(Continued)

*Primary Examiner* — Dang Ton
*Assistant Examiner* — Wei Zhao
(74) *Attorney, Agent, or Firm* — Leon R. Turkevich

(57) ABSTRACT

Each mobile router in a mobile ad hoc network is configured for measuring a minimum interval of stable relative proximity ($SProx_{MIN}$) between at least one neighbor before initiating convergence of a routing protocol. The minimum interval of stable relative proximity requires any variation in relative proximity between at least one neighbor to be stabilized below a prescribed stability threshold (S) for the prescribed minimum interval ($SProx_{MIN}$) before initiating convergence of a routing protocol. Hence, mobile routers in a mobile ad hoc network can be configured to avoid prematurely initiating reconvergence according to a routing protocol due to an instability introduced into the network.

12 Claims, 6 Drawing Sheets

OTHER PUBLICATIONS

Perkins, "Ad Hoc Networking", 2001, Addison-Wesley, Ch. 3, "DSDV Routing over a Multihop Wireless Network of Mobile Computers", pp. 53-74.

Perkins et al., "Ad hoc On-Demand Distance Vector (AODV) Routing", Network Working Group, Request for Comments (RFC) 3561, Jul. 2003, pp. 1-37.

* cited by examiner

INITIATION OF ROUTING CONVERGENCE BY A MOBILE ROUTER IN A MOBILE AD HOC NETWORK IN RESPONSE TO REACHING A MINIMUM INTERVAL OF STABLE RELATIVE PROXIMITY BETWEEN AT LEAST ONE NEIGHBOR

BACKGROUND OF THE INVENTION

1. Field of the Invention

The present invention relates to deployment of interior gateway routing protocols in networks having movable network nodes, for example a mobile ad hoc network (MANET) routing protocol.

2. Description of the Related Art

Wide area packet switched networks such as the Internet have become an integral part of worldwide commerce in part due to the ability of different networks to interoperate without central control. In particular, the decentralization of control is possible due to routing protocols which enable routers to communicate amongst each other and share routing information: routing protocols include operations such as router advertisement, router discovery or neighbor discovery, link state advertisement, and the sharing of all or at least a portion of respective routing tables:

Numerous interior gateway routing protocols (IGPs) have been developed to satisfy various design requirements, including optimality (selecting the optimal route), simplicity and low overhead to minimize burden on system resources, robustness (i.e., maintaining operability despite failures within the network), rapid convergence, stability, and flexibility in adapting to network changes. Such routing protocols can be either proactive or reactive: proactive routing protocols determine a path to a destination before the path is needed to forward a packet, whereas reactive routing protocols determine the path to a destination in response to a need to forward a packet to the destination.

The overall sequence of operations of interior gateway routing protocols (e.g., distance vector, link state) in building a loop-free path can be summarized with respect to FIG. 1. Such routing protocols in general begin with neighbor discovery in step 10 during initialization of the network, where a router discovers other routers that are within a prescribed interior of an administrative domain: the administrative domain determines the boundary of the network as an Autonomous System. The example of FIG. 1 assumes a fixed network, where network nodes (e.g., routers, hosts, etc.) are "fixed" at respective locations relative to each other, unlike mobile nodes which inherently move relative to each other (described in further detail below).

The fixed router in the fixed network then stores a candidate set of neighboring routers ("neighbors") within the administrative domain (i.e., "interior neighbors"), and performs in step 12 some form of a database exchange with the candidate set of neighbors, enabling the router and neighboring routers each to calculate in step 14 an acyclic graph for each identifiable destination in the administrative domain. The acyclic graph is calculated in step 14 according to a loop-free network topology, and according to prescribed optimization parameters and metrics for the corresponding routing protocol, for example lowest latency, least cost, shortest hops, etc. The acyclic graphs calculated in step 14 are used to build a forwarding table for each destination in step 16, enabling the router to begin forwarding packets in step 18.

Once the fixed router has established the forwarding table in step 16 in order to forward packets in step 18, the router performs neighbor management in steps 20 and 22. In particular, the router starts a timer (a "stale timer") (T) in step 20 to monitor the state of the neighbors in the candidate set of neighbors: the routing protocol is configured to wait in step 22 for a prescribed time interval (T=T1) to determine if a given neighbor is detected within the prescribed time interval (T1).

If in step 22 the neighbor is not detected within the prescribed time interval (T=T1), the router declares the neighbor as stale for purposes of its internal forwarding table; if in step 22 the neighbor is not detected within a further prescribed time interval (T=T2, where T2>T1), the router removes the stale neighbor from the candidate set of neighbors in step 22, and performs a new database exchange according to the routing protocol to inform the neighbors in step 12 that the stale neighbor is no longer reachable. The process repeats in recalculating acyclic graphs in step 14, and building the forwarding tables in step 16.

A fundamental aspect of the timer (T) in step 20 is that the network is assumed to be stable (i.e., the network has converged and routes have been optimized) for a prescribed time interval (T=T0, where T0<T1) after having started the timer (T). Convergence is the process of agreement, by all routers, on optimal routes; in other words, convergence refers to the initial calculation or recalculation of routes by a router and the distribution of routing information to the other routers, as illustrated in steps 12 and 14, in order to maintain consistency between the routers in view of the recalculation of routes. The assumed stability in the network during the prescribed time interval (T=T0), also referred to as the "stability interval", provides a minimum time interval during which acyclic graphs and forwarding tables do not need to be recalculated. The prescribed stability interval (T=T0) is manually configured by a traffic engineer to balance between the amount of network traffic that is consumed by the database exchange process and the amount of processor time consumed by the router in recalculation of acyclic graphs and forwarding tables (i.e., minimizing network and router resources for neighbor maintenance and route maintenance), versus the accuracy of the router in identifying the topology of the network (i.e., minimizing the staleness of the network information).

In addition, the prescribed stability interval (T=T0) is manually configured by the traffic engineer based on the assumption that the loss of a neighbor in the fixed network is due to physical interruptions in the network, for example a hardware or software failure in a neighboring node, a link failure, scheduled maintenance of a node or link, etc; as such the traffic engineer assumes a relatively low probability of failure. Hence, the routing protocol executed by the routers in the network is configured by a traffic engineer for operating in a fixed network having a low probability of failures; in the event of a failure that result in the loss of an existing path, however, an interior gateway routing protocol as described above enables an alternate path to a destination to be determined due to the loss of the existing path.

Optimized selection of the stability interval (T=T0) can be important in minimizing "route flapping", where paths to a given destination are changed repeatedly due to intermittent errors. Hence, traffic engineering requires consideration of parameters and attributes such as topology, bandwidth, traffic, throughput requirements, etc.

The foregoing considerations by traffic engineers in determining an appropriate stability interval are further complicated in a mobile network, where nodes are no longer fixed but are mobile as described in the Internet Engineering Task Force (IETF) Request for Comments (RFC) 3775 and RFC 3963. In the case of a mobile network, all of the previously static network attributes can now change over time, including the identity of neighboring nodes, the availability of links, the shape of the network topology, etc.

Hence, the traffic engineering described above with respect to fixed networks is less relevant in mobile networks, because the underlying assumptions of a fixed network no longer apply; consequently, the prescribed stability interval (T=T0) is substantially less relevant in a mobile network because the continual variations in neighbor identity, link availability, network topology, etc., prevent the mobile network from ever being "stable" as defined in fixed networks.

In other words, the issue confronting traffic engineers has been addressed from the perspective of how to determine the minimum length of time (Tm) to wait before assuming that a neighboring node has disappeared (i.e., is no longer available) in order to trigger reconvergence of the routing protocol. As described above, this issue historically has been addressed in fixed networks by setting a prescribed stability interval (Tm=T0) for fixed nodes assumed to have a relatively high degree of reliability (i.e., a relatively low probability of unavailability).

Attempts to apply existing routing protocols to a mobile ad hoc network do not adequately address the fundamental issue of mobility of network nodes. For example, the Fisheye routing protocol, as described in the publication by Pei et al, "Fisheye State Routing: A Routing Scheme for Ad Hoc Wireless Networks", suggests reducing the frequency of link state update messages as the number of hops to an affected router increases. Hence, Pei et al. suggests that link state updates related to closer nodes are distributed to next hop nodes more frequently than link state updates related to further nodes; in other words, the quality of the topological information of an identified node in a topology table of a given node is inversely proportional to the hop count distance between the given node and the identified node.

Although the above-described Fisheye routing protocol may reduce route recalculation and flooding of link state advertisement messages due to changes in distant network nodes, it does not address the fundamental issue of mobility of network nodes, as illustrated with respect to FIG. 2.

FIG. 2 is a diagram illustrating a mobile ad hoc network 30 formed initially between mobile routers 32a and 32b via a wireless link 34 before a time reference "t0–2" (i.e., before detecting the presence of the mobile router 32c located at its position "$C_{t0-2}$"). The mobile routers 32a, 32b and 32c may be deployed, for example, on respective jet fighter planes. As illustrated in FIG. 2, the mobile routers 32a and 32b are moving at respective velocity vectors VA and VB that are substantially equal to each other (VA=VB); hence, the relative velocity (VR) between the mobile routers 32a and 32b is negligible ($VR_{AB}=VR_{BA}=0$), enabling the mobile routers 32a and 32b to establish a reliable wireless communication link between each other, and establish forwarding tables as described above with respect to FIG. 1. The mobile router 32c, however, is not detected by the mobile routers 32a or 32b while the mobile router 32c is at its position "$C_{t0-2}$" at time "t0–2", as illustrated by the absence of any wireless links 34 and the dashed lines at the position "$C_{t0-2}$".

The jet fighter plane carrying the mobile router 32c is moving at the corresponding velocity vector VC, where the velocity vector VC is the same magnitude but opposite direction of the velocity vectors VA and VB (VC=−VA). Hence, if the magnitude (i.e., speed) of each velocity vector VA, VB, and VC is mach 1 (approximately 1,225 km/h or 761 miles/hr), the relative speed velocity between the mobile router 32c and the mobile routers 32a and 32b would be mach 2 ($VR_{AC}=VR_{BC}=2VA=$mach 2).

As illustrated in FIG. 2, the mobile routers 32a and 32b detect the mobile router 32c (and mobile router 32c detects mobile routers 32a and 32b) as the mobile router 32c moves to its corresponding position "$C_{t0-1}$" at time reference "t0–1", as illustrated by the establishment of the wireless links 34a and 34b. Each of the mobile routers 32a, 32b, and 32c respond to the detection of the mobile router 32c and establishment of the links 34a, 34b by performing database exchange, recalculating acyclic graphs and building forwarding tables as described above with respect to FIG. 1, during which time the mobile router 32c has moved to the position "$C_{t0}$" at time reference "t0". By the time the mobile routers 32a, 32b and 32c can begin to forward packets to each other as described with respect to step 18 of FIG. 1, the mobile router 32c will have moved to the position "$C_{t0+1}$" at time reference "t0+1". Consequently, the continued movement of the mobile router 32c to the position "$C_{t0+2}$" at time reference "t0+2" will cause the mobile routers 32a and 32b to lose connectivity with the mobile router 32c, requiring the mobile routers 32a and 32b to perform route recalculation in view of the loss of the mobile router 32c.

Hence, the mobile router 32c belongs to the mobile ad hoc network of FIG. 2 only for the time interval (TC) between "t0–1" and "t0+1", referred to herein as the "connected time interval" (TC=(t0+1)−(t0−1)=2 time units). This connected time interval is inversely proportional to the relative velocity between the mobile routers (VR=2VA=2VB); therefore, while at slower speeds (e.g., VR<200 mph) the connected time interval may be adequate for the mobile ad hoc routers 32a, 32b, and 32c to recalculate the network and perform network convergence and meaningful data exchange (e.g., data synchronization by application layer processes), at higher speeds (e.g., VR>1500 mph) the connected time interval (TC) may be so brief (e.g., TC=2 microseconds) that no meaningful data exchange can take place, such that the route recalculation and database exchange by mobile routers 32a and 32b to add mobile router 32c provides no beneficial effect.

Further, failure to complete network convergence within the connected time interval may result in network disruption while the mobile routers 32a and 32b need to recalculate the original routes upon the loss of the mobile router 32c at time "t0+2". Hence, the route recalculation by the mobile routers 32a and 32b in response to detecting the mobile router 32c may result in a disruption of the optimized MANET having initially been established between the mobile routers 32a and 32b.

As apparent from the foregoing description of FIG. 2, the proximity of a node as relied on in the Fisheye routing protocol has no relevance to the stability of a dynamic network with respect to determining whether to distribute routing information: even though the mobile router 32c is one hop away from the mobile routers 32a and 32b, the addition of the mobile router 32c does not necessarily benefit the routers 32a and 32b, and may in fact disrupt the existing MANET network 30.

Other proposals in the art, such as Carofiglio et al., "Analysis of Route Stability in MANETs", suggest estimating a path duration based on probability characteristics, but does not address the effect of path duration in determining whether to perform route recalculation.

Another proposal described in Bush et al., "The Limits of Motion Prediction Support for Ad hoc Wireless Network Performance", suggests exchanging "models of motion" and using these models to determine "the frequency at which routing updates are required." In particular, Bush et al. assumes that a node will know the relative motion of other nodes, and that a node will be able to determine how often to exchange routing information with other nodes. However, Bush et al. does not describe how a node learns of the relative motion of another node. In other words, node A only knows about the actual motion of A, but does not know about the actual motion of node B; consequently, each node independently determines the frequency of outputting its own routing updates based on its own corresponding motion (i.e., relative motion of nodes). Hence, Bush et al. does not address the problem of how to determine the relative motion of other nodes without exchanging information between the nodes.

A solution to these and other problems is described in the accompanying brief description of the attached drawings and the accompanying description of embodiment(s) of the invention as specified in the appended claims, the description of the embodiment(s) including at least one best mode for carrying out the invention.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

There is a need for an arrangement that enables a router to determine whether a routing update should be performed in a mobile ad hoc network (MANET) based not only on existing parameters such as network topology, network type, the type of IGP-based routing protocol, or the speed of links, but also based on the stability of the MANET.

There also is a need for an arrangement that enables a stability of a MANET to be quantified in order to minimize routing updates that may disrupt the network stability due to movement of network nodes within the MANET.

According to the disclosed embodiment, a new metric is introduced to enable a traffic engineer to optimize a network routing protocol for the conditions encountered by a MANET network. This new metric measures a minimum interval of stable relative proximity ($SProx_{MIN}$) between at least one neighbor before initiating convergence (e.g., recalculation of paths or routes stored in a path database) according to a routing protocol.

Figure 3:
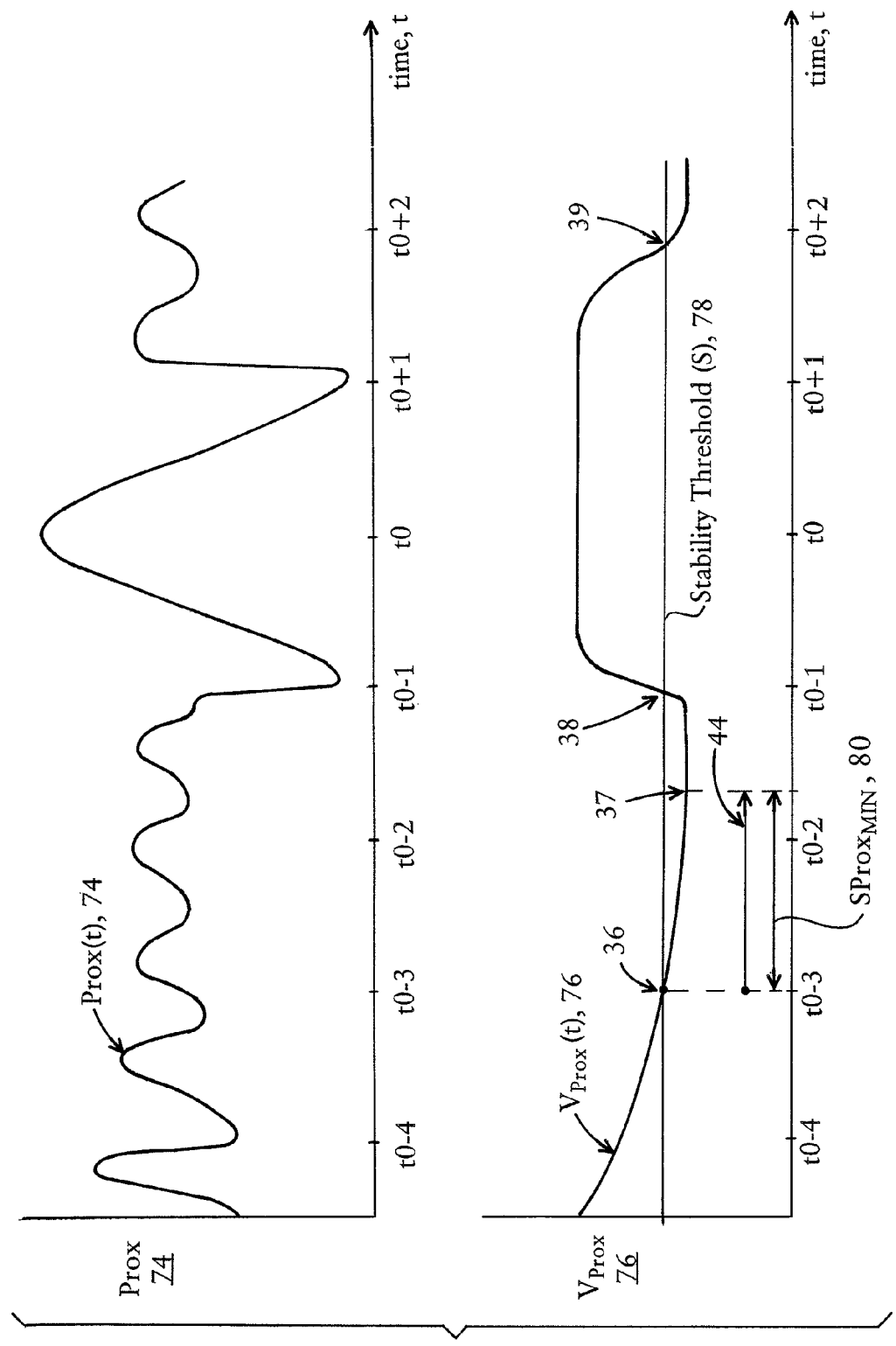
FIG. 3 is a diagram illustrating a novel metric of a minimum interval of stable relative proximity ($SProx_{MIN}$) that is used to determine when to initiate convergence according to a routing protocol in a mobile ad hoc network, according to an embodiment of the present invention.

FIG. 3 is a diagram illustrating the novel metric of a minimum interval of stable relative proximity ($SProx_{MIN}$) 80. The metric of "a minimum interval of stable relative proximity" ($SProx_{MIN}$) 80 requires any variation in relative proximity ($V_{Prox}$) 76 between at least one neighbor to be reduced (i.e., stabilized) below a prescribed threshold (S) 78 (i.e., the stable relative proximity) for the prescribed minimum interval ($SProx_{MIN}$) 80 before initiating convergence of a routing protocol (e.g., route recalculation, etc.). As described in detail below, the relative proximity between at least one neighbor (Prox) 74 is determined based on inputs that quantify the reliability of the corresponding communication link between the at least one neighbor (e.g., link signal strength, link speed, physical coordinates of the neighbor, motion vectors of the neighbor, etc.).

The minimum interval of stable relative proximity ($SProx_{MIN}$) 80 also can be used to measure the aggregate stability of the relative proximity (Prox) 74 of all the neighboring nodes of a prescribed set to each other; hence, the variations ($V_{Prox}$) 76 in the relative proximity (Prox) 74 of all of the neighboring nodes of the prescribed set must be stabilized below the stability threshold (S) 78, for the prescribed minimum interval (e.g., $SProx_{MIN}$=n seconds) 80 before initiating convergence of the relevant routing protocol.

Hence, the dynamic nature of a MANET network can be measured not only in terms of existing parameters (e.g., such as network topology, network type, the type of IGP-based routing protocol, or the speed of links), but also based on a minimum interval of stable relative proximity ($SProx_{MIN}$) 80 between the neighbors. Hence, traffic engineering attributes (e.g., latency, fairness, etc.,) used to optimize an interior gateway routing protocol for use in a MANET network can be based not only on the existing timer that measures a minimum time (T=Tm) to wait before assuming a neighboring node has disappeared to trigger reconvergence of the routing protocol, but also on the minimum interval of stable relative proximity between neighbors ($SProx_{MIN}$) 80, ensuring that a convergence is not triggered prematurely due to an instability introduced into the network. Rather, convergence can be delayed until a determination has been made that the neighboring nodes are determined to have maintained a minimum order before the network is considered stable enough to justify reconvergence.

Figure 4:
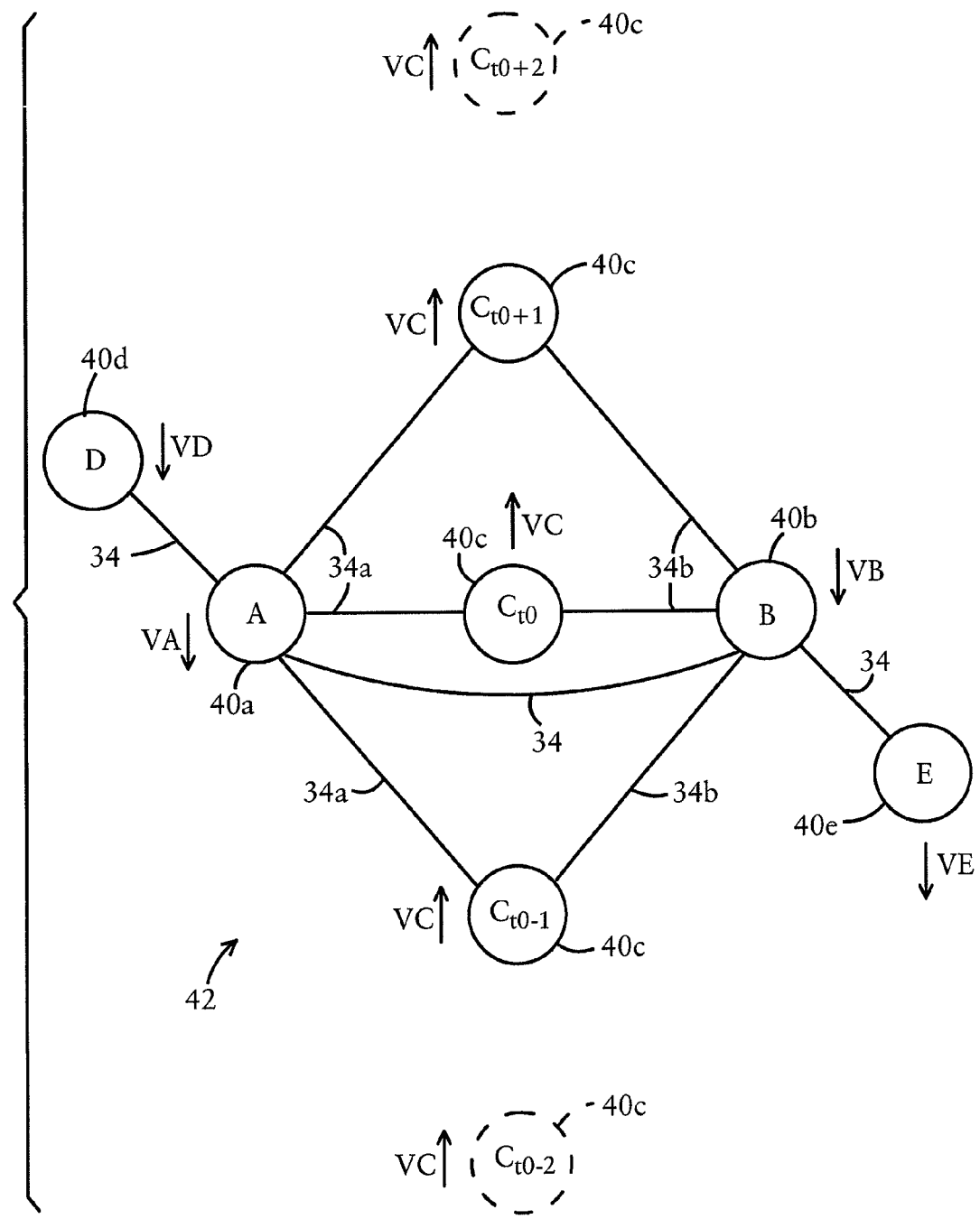
FIG. 4 is a diagram illustrating a mobile ad hoc network having mobile ad hoc nodes configured for initiating convergence in response to reaching a minimum interval of stable relative proximity in the mobile ad hoc network, according to an embodiment of the present invention.

To further illustrate the minimum interval of stable relative proximity ($SProx_{MIN}$) 80, consider the example that the time-varying value of the relative proximity (Prox(t)) 74 illustrates the aggregate relative proximity between the mobile routers 40a, 40b, 40d, and 40e moving at the respective velocities VA, VB, VD, and VE in the mobile ad hoc network 42 of FIG. 4. Between the time intervals "t0–4" and "t0–3" the mobile routers 40a, 40b, 40d, and 40e have established wireless links 34 between each other, however the relative proximity (Prox (t0–4<t<t0–3)) fluctuates due to continued variations in the respective velocity vectors, instability due to initialization of the wireless link 34, physical disturbances affecting the wireless link 34 (e.g., electromagnetic interference, physical obstructions), etc.; hence, the variation in relative proximity ($V_{Prox}$(t0–4<t<t0–3)) remains above the stability threshold (S) 78.

Between the time intervals "t0–3" and "t0–2", however, the fluctuations in the relative proximity between the mobile routers 40a, 40b, 49d, and 40e (Prox(t0–3<t<t0–2)) have reduced, for example due to improved coordination in the velocity vectors, optimization of the wireless link 34, etc., causing the variation in relative proximity ($V_{Prox}$(t0–3<t<t0–2)) to fall below the stability threshold (S) at event 36. As described below with respect to FIG. 5, the detection of the variation in relative proximity ($V_{Prox}$) at event 36 by the mobile routers 40a, 40b, 40d, and 40e causes a routing convergence initiation resource 46 in each mobile router 40a, 40b, 40d, and 40e to initiate a corresponding stability timer (TSProx) 44. If at any time during the counting by the stability timer (TSProx) 44 the variation in relative proximity ($V_{Prox}(t)$) 76 exceeds the stability threshold (S) 78, the routing convergence initiation resource 46 in the corresponding mobile router 40a, 40b, 40d, and 40e halts and resets the stability timer 44.

In response to the stability timer (TSProx) 44 reaching the prescribed minimum interval of stable relative proximity (TSProx=$SProx_{MIN}$) at event 37, indicating the mobile routers 40a, 40b, 40d, and 40e have established stable relative proximity for the minimum interval, the routing convergence initiation resource 46 in each corresponding mobile router 40a, 40b, 40d, and 40e can initiate routing convergence according to the relevant routing protocol, including resetting any other timer 62 that may be in use.

Figure 1:
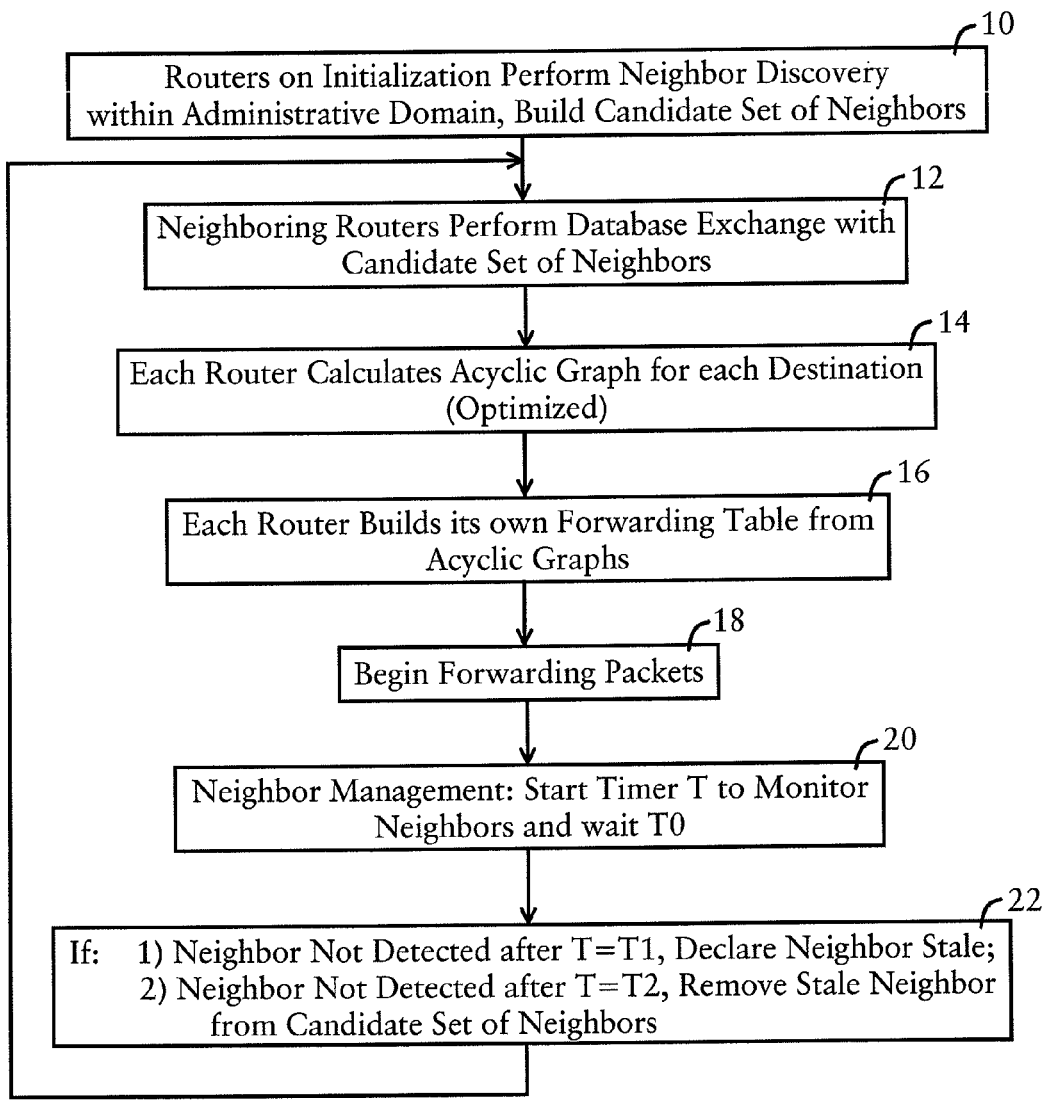
FIG. 1 is a diagram illustrating a sequence of operations according to conventional (PRIOR ART) interior gateway routing protocols in building loop-free paths in a network.
Figure 2:
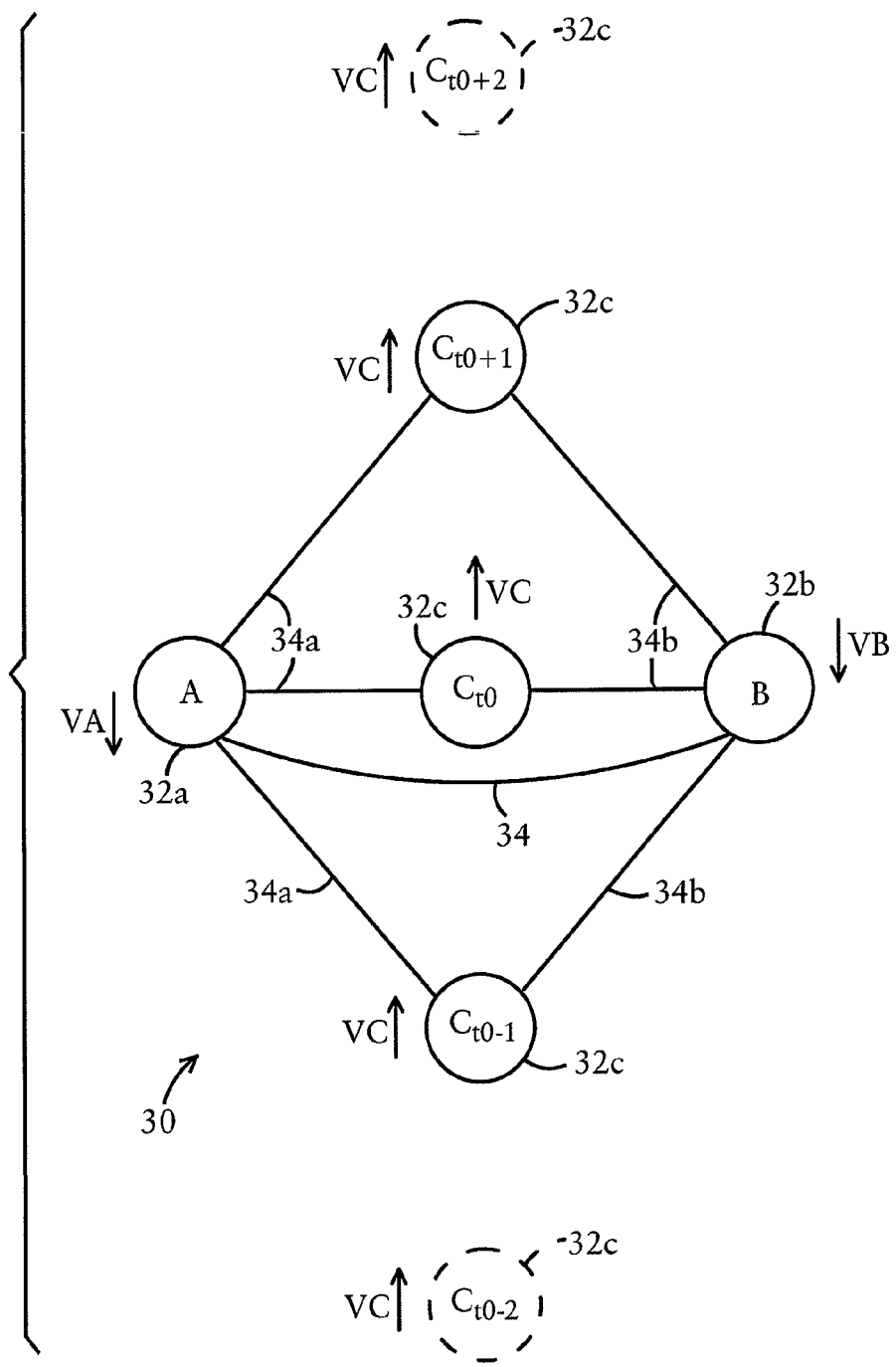
FIG. 2 is a diagram illustrating instability introduced into a conventional (PRIOR ART) mobile ad hoc network due to a mobile router passing through the mobile ad hoc network.

Assume now that a new mobile router 40c has a velocity vector VC similar to the mobile router 32c of FIG. 2 (VC=−VA). In particular, assume the mobile router 40c is detected by the mobile routers 40a and 40b at time "t0−1", passes between the mobile routers 40a and 40b at time "t0", moves to its furthest location from the mobile routers 40a and 40b while remaining within the MANET 42 at time "t0+1", and is no longer connected to the MANET 42 at time "t0+2". Hence, the mobile router 40c becomes part of the layer 2 mesh network between the mobile routers in the MANET 42 via the links 34a and 34b. Consequently, the relative proximity (Prox(t)) 74 detected by mobile routers 40a and 40b is updated due to the detection of the mobile router 40c, which reaches a minimum value at time "t0−1", a maximum value at time "t0", and another minimum value at time "t0+1", resulting in a substantial increase in the variation in relative proximity ($V_{Prox}$) 76 that exceeds the stability threshold (S) 78 at event 38. Hence, the routing convergence initiation resource 46 in each mobile router 40a and 40b halts and resets its corresponding stability timer 44 in response to the variation in relative proximity ($V_{Prox}$) exceeding the stability threshold (S) at event 38, preventing any convergence from initiating. The stability timer 44 is not restarted until event 39, where the variation in relative proximity ($V_{Prox}$) falls back below the stability threshold (S).

Hence, the minimum interval of stable relative proximity ($SProx_{MIN}$) 80 ensures that instability is not introduced into the routing protocol of the MANET 42 due to the mobile router 40c. Although the mobile router 40c may establish connectivity with the mobile routers 40a and 40b, the mobile routers 40a and 40b do not perform convergence (e.g., recalculate routes and paths to include the mobile router 40c) because the mobile router 40c has not established the minimum interval of stable relative proximity relative to the other mobile routers 40a and 40b.

Also note that even though the mobile router 40c is not detected by mobile routers 40d and 40e, any update messages output by the mobile routers 40c and 40d during the instability interval (between events 38 and 39) can be cached by the mobile routers 40a and 40b; alternately, the mobile routers 40a and 40b may flood ICMP messages specifying a detected instability in order to prevent the mobile routers 40d and 40e from initiating convergence (and causing them to reset their respective stability timers 44 in response to the instability messages).

Figure 5:
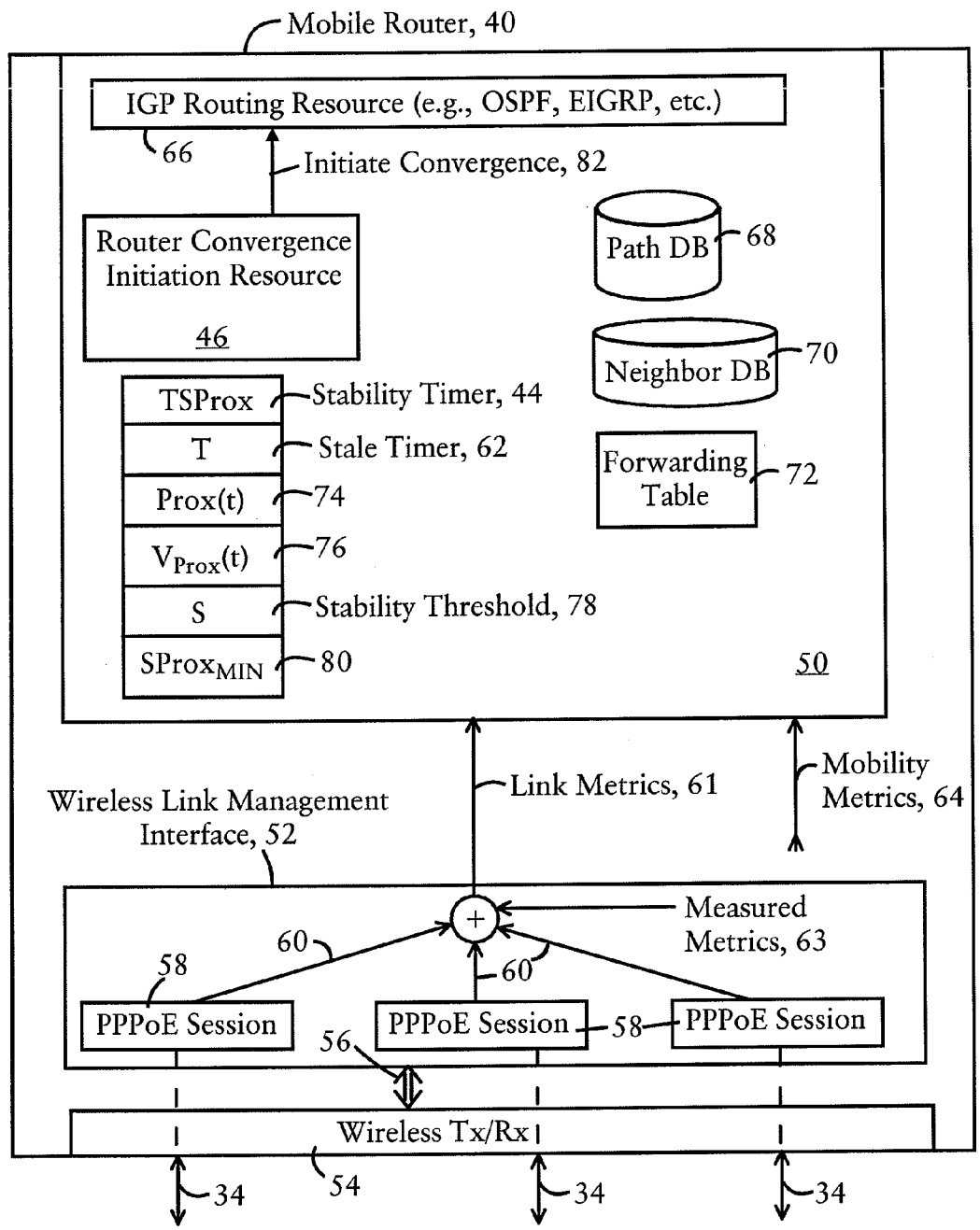
FIG. 5 is a diagram illustrating one of the mobile routers of FIG. 4, according to an embodiment of the present invention.
Figure 6:
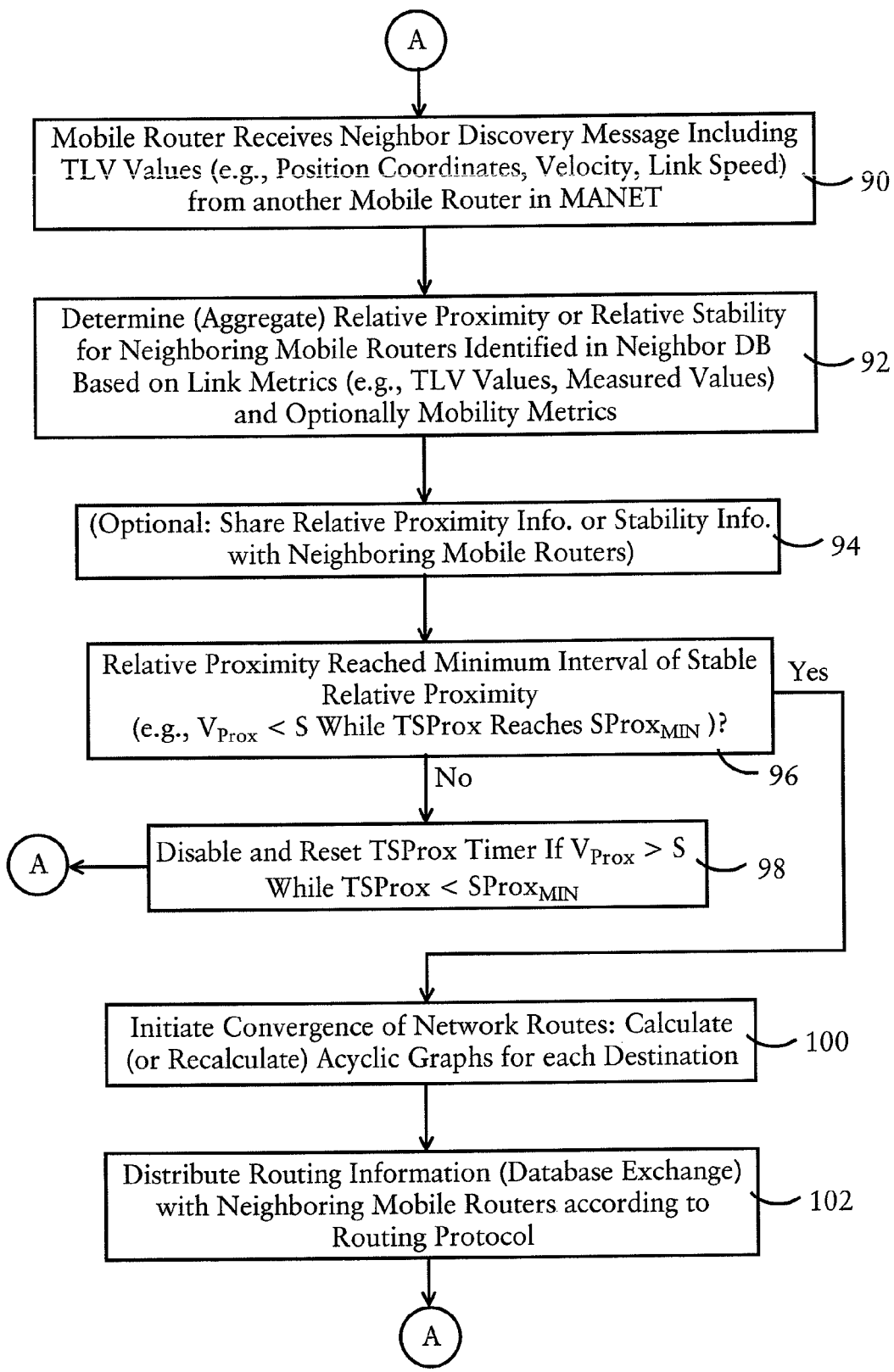
FIG. 6 is a diagram illustrating the method of initiating routing convergence by one of the mobile routers in FIG. 5, according to an embodiment of the present invention.

FIG. 5 is a diagram illustrating one of the mobile routers 40 of FIG. 4, according to an embodiment of the present invention. The mobile router 40 includes a routing portion 50, a wireless link management interface 52, and a wireless physical layer transceiver 54 that serves as a wireless access point for other wireless nodes such as wireless host nodes (e.g., wireless laptops, etc.) or other mobile ad hoc routers. FIG. 6 is a diagram illustrating a method by the mobile router 40 of initiating convergence of network routes in response to a relative proximity reaching a prescribed minimum interval of stable relative proximity ($SProx_{MIN}$). The steps described in FIG. 6 can be implemented as executable code stored on a tangible computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

The wireless link management interface 52 provides layer 2 (link layer) management, including flow control between the routing portion 50 and the radios of the other wireless nodes (e.g., wireless host nodes or mobile ad hoc routers) via the wireless transceiver 54 according to IPv4 or IPv6 protocol. In particular, the wireless transceiver 54 is configured for establishing distinct wireless links 32 with the various wireless nodes, where each wireless link 32 may have a corresponding data rate with the corresponding connected wireless node, depending on the corresponding proximity of the corresponding connected wireless node and the capabilities of the corresponding wireless node (e.g., depending on whether the wireless node is using an IEEE 802.11a, 802.11b or 802.11g transceiver). Since the wired connection 56 between the link management interface 52 and the wireless transceiver 54 may be implemented as a 1 Gb Ethernet link, the wireless link management interface 52 is configured for establishing multiple PPP over Ethernet (PPPoE) sessions 58 for the respective connected wireless nodes. Each PPPoE session 58 has its own set of flow control credits and link metrics, described in further detail in the Internet Draft by Berry et al., entitled "PPP Over Ethernet (PPPoE) Extensions for Credit Flow and Link Metrics" (draft-bberry-pppoe-credit-05.txt), available at the IETF website "ietf.org".

Hence, each PPPoE session 58 is configured for receiving the link layer packets (e.g., neighbor discovery messages) from the corresponding connected wireless node (e.g., a host node such as a wireless laptop or a mobile ad hoc router) in step 90 of FIG. 6, and forwarding link metrics 60 for the corresponding wireless link 34 to the routing convergence initiation resource 46 in the routing portion 50. The overall link metrics 61 output by the wireless link management interface 52 include the supplied values 60 from the received link layer packets, and also may include measured values 63 detected by the mobile router 40. For example, the supplied values 60 in the received link layer packets may specify physical attributes of the corresponding connected wireless node, including position, velocity, acceleration, and/or link attributes such as wireless link speed (in bits per second), transmitter power (in dBm), etc. The position attributes my be measured in GPS coordinates, Geodesic coordinates, dBm in an RF vector space, or some other coordinates according to a prescribed coordinate system. The supplied values 60 in the received link layer packets may be expressed in the form of Type-Length-Value (TLV) information that is included in OSI layer 2 (i.e., link layer) neighbor discovery messages.

The link metrics 61 also may include measured values 63 by the mobile router 40, for example a received signal strength indicator (RSSI) for the corresponding link 34, radar measurements by an on-board ultrasonic radar that detects relative positions of the surrounding vehicles carrying the respective connected wireless nodes, etc. Hence, the measured values 63 may e generated by on-board physical sensors that detect the connected wireless nodes.

The routing convergence initiation resource 46 also is configured for receiving mobility metrics 64 from a mobility platform (not shown) that controls the movement of the vehicle carrying the mobile router 40. The mobility metrics 64 may include, for example, the physical position, orientation, velocity, and/or acceleration of the vehicle carrying the mobile router 40.

Hence, the routing convergence initiation resource 46 is configured for receiving the link metrics 60 and/or 63 for a given link 34 specifying attributes for quantifying the relative distance of the corresponding connected wireless node as a measure of the relative reliability ("stability") of the link 34 with the wireless node.

The routing portion 50 includes an interior gateway protocol (IGP) based routing resource 66, the routing convergence initiation resource 46, the stability timer 44, the stale timer 62, a path database 68, a neighbor database 70, a forwarding table 72, and memory locations for storing the determined relative proximity (Prox(t)) 74, the determined variation in relative proximity ($V_{Prox}(t)$) 76, the prescribed stability threshold (S) 78, and the prescribed minimum interval of stable relative proximity ($SProx_{MIN}$) 80.

The interior gateway protocol (IGP) based routing resource 66 is configured for populating the neighbor database 70 based on prescribed neighbor discovery protocols, and performing database exchange with neighbors in accordance with the selected routing protocol. The routing resource 66 also is configured for implementing convergence of the routing protocol based on calculation of acyclic graphs for each destination and storage thereof in the path database 68, and populating the forwarding table 72 based on the optimization of the acyclic graphs in the path database 68. As described below, the routing resource 66 is configured to initiate convergence in response to an initiation command 82 from the routing convergence initiation resource 46.

The routing convergence initiation resource 46 is configured for determining in step 92 of FIG. 6 the relative proximity (Prox(t)) for each wireless node based on the received link metrics 60 and mobility metrics 64, and generating an aggregate relative proximity (Prox(t)) 74 for the set of candidate mobile routers specified in the neighbor database 66. The routing convergence initiation resource 46 can be configured for assessing the multiple dimensional attributes of the link metrics 60 and mobility metrics 64 in order to ascertain the aggregate relative proximity (Prox(t)) 74. For example, the routing portion 50 could implemented in the form of an object-oriented database system as described in the published U.S. Patent Publication No. US2005/0076054 A1, published Apr. 7, 2005, entitled "Arrangement for Autonomous Mobile Network Nodes to Organize a Wireless Mobile Network Based on Detected Physical and Logical Changes", the disclosure of which is incorporated in its entirety herein by reference. Using the object-oriented architecture disclosed in the above-incorporated Patent Publication US2005/0076054 A1, the routing convergence initiation resource 46 can be configured as a "smart world object" that generates a decision 82 to initiate convergence based on identifying, from among the link metrics 60 and other attributes such as "relative proximity objects" stored in the "world database" as described in the Patent Publication US2005/0076054 A1, that the network 42 has reached a minimum interval of stable relative proximity. Further, the link metrics 60 and mobility metrics 64 can be received in the form of geospatial information, where the routing convergence initiation resource 46 is configured for determining the stability of the network 42 as identified within the database of world objects as described in the Patent Publication US2005/0076054 A1. Alternatively, the router convergence initiation resource 46 can be implemented as executable code that is distinct from the routing resource 66.

If desired, any of the network attributes that quantify a link reliability or network stability can be forwarded in step 94 to the other mobile routers 40, as appropriate, without initiating reconvergence, in order to enable the other mobile routers 40 to assess the stability of the network based on the relative proximity 74 as determined by the respective mobile routers 40.

The routing convergence initiation resource 46 also updates the variation in relative proximity ($V_{Prox}(t)$) 76 for any change in the relative proximity (Prox(t)) 74, and initiates (i.e., enables) the stability timer if the variation in relative proximity ($V_{Prox}(t)$) 76 falls below the prescribed stability threshold 78 (see step 96); if at any time the variation in relative proximity ($V_{Prox}(t)$) 76 exceeds the prescribed stability threshold 78, the timer 44 is disabled and reset in step 98.

If in step 96 the routing convergence initiation resource 46 determines that the relative proximity has reached the minimum interval of stable relative proximity (e.g., if the stability timer 44 reaches the prescribed minimum interval of stable relative proximity ($SProx_{MIN}$) 80), the routing convergence initiation resource 46 is configured for outputting the initiation command 82 in step 100 to the routing resource 66, assuming the requirements for the stale timer 62 have been satisfied, causing the routing resource 66 to initiate convergence of network routes in step 100 by calculating acyclic graphs for each destination in the MANET 42, and perform database exchange in step 102 according to the routing protocol.

Hence, the routing convergence initiation resource 46 is able to monitor physical attributes in the network 42, including a new link 34 having been established by the wireless transceiver 54, a failed link 34, variations in network topology or link characteristics, or any other factor that affects reliability of a link 34, and adjust its determined values 74 and 76, as appropriate.

According to the disclosed embodiment, each mobile router is configured for determining a minimum interval of stable relative proximity before initiating convergence of a routing protocol, ensuring that instability is not introduced into a network due to premature initiation of convergence according to the routing protocol. Hence, stability in a MANET network is ensured, despite the inherently unpredictable nature of mobile ad hoc nodes and the associated layer 2 communication links.

Although the minimum interval of stable relative proximity has been illustrated with respect to a static threshold (S) and a static time-based interval (between events 36 and 37), it will be apparent that the minimum interval of stable relative proximity also may be implemented using heuristic methods. For example the minimum interval of stable relative proximity may utilize a substantially smaller time interval for a substantially smaller variation in relative proximity, as opposed to a larger time interval for a corresponding larger variation in relative proximity. Dimensions other than time also may be used to determine the minimum interval of stable relative proximity, for example monitoring of relative proximity based on link metrics from the neighboring nodes and the mobility metrics to determine whether the deviation of the relative proximity stabilizes about a statistical norm.

Also note that the disclosed calculus of a prescribed minimum interval of stable relative proximity among network routers need not necessarily be limited to mobile routers in a mobile ad hoc network, but could be extended to other types of networks having identified borders, where the minimum interval of stable relative proximity is determined among the network routers that are within the identified border.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a mobile ad hoc router that is within a mobile ad hoc network, the method including:
    determining by the mobile ad hoc router a relative proximity of at least one neighboring node relative to the mobile ad hoc router, the relative proximity indicating a relative reliability of a wireless communication link between the mobile ad hoc router and the at least one neighboring node; and
    initiating by the mobile ad hoc router a convergence of network routes according to a prescribed routing protocol, that includes the neighboring node, in response to the mobile ad hoc router determining that a determined variation in the relative proximity has reached a prescribed minimum interval of stable relative proximity;
    wherein the mobile router determines whether the determined variation in the relative proximity reaches the prescribed minimum interval of stable relative proximity based on:
    initiating a stability timer in response to the determined variation in the relative proximity falling below a prescribed stability threshold, and
    determining whether the determined variation in the relative proximity remains below the prescribed stability threshold for the prescribed minimum interval according to a prescribed minimum time interval.

2. The method of claim 1, further comprising receiving, by the mobile ad hoc router, a neighbor discovery message including link metrics from the neighboring node, the determining including determining the relative proximity based on the link metrics.

3. The method of claim 2, wherein the relative proximity identifies an aggregate relative proximity of a plurality of mobile ad hoc routers within the mobile ad hoc network including said at least one neighboring node.

4. The method of claim 1, further comprising forwarding information describing the relative proximity to at least another neighboring node.

5. A mobile ad hoc router that is within a mobile ad hoc network, the mobile ad hoc router including:
    a routing resource configured for initiating a convergence of network routes according to a prescribed routing protocol in response to an initiation command;
    a routing convergence initiation portion configured for determining a relative proximity of at least one neighboring node relative to the mobile ad hoc router, the relative proximity indicating a relative reliability of a wireless communication link between the mobile ad hoc router and the at least one neighboring node, the routing convergence initiation portion configured for outputting the initiation command in response to the routing convergence initiation portion determining that a determined variation in the relative proximity has reached a prescribed minimum interval of stable relative proximity; and
    a stability timer, the routing convergence initiation portion configured for determining whether the determined variation in the relative proximity has reached the prescribed minimum interval of stable relative proximity based on:
    initiating the stability timer in response to the determined variation in the relative proximity falling below a prescribed stability threshold, and
    determining whether the determined variation in the relative proximity remains below the prescribed stability threshold for the prescribed minimum interval according to a prescribed minimum time interval.

6. The mobile ad hoc router of claim 5, further comprising a link management interface configured for receiving a neighbor discovery message including link metrics from the neighboring node, the routing convergence initiation portion configured for determining the relative proximity based on the link metrics.

7. The mobile ad hoc router of claim 6, wherein the relative proximity identifies an aggregate relative proximity of a plurality of mobile ad hoc routers within the mobile ad hoc network including said at least one neighboring node.

8. The mobile ad hoc router of claim 5, wherein the mobile ad hoc router is configured for forwarding information describing the relative proximity to at least another neighboring node.

9. A mobile ad hoc router that is within a mobile ad hoc network, the mobile ad hoc router including:
    means for determining a relative proximity of at least one neighboring node relative to the mobile ad hoc router, the relative proximity indicating a relative reliability of a wireless communication link between the mobile ad hoc router and the at least one neighboring node; and
    means for initiating a convergence of network routes according to a prescribed routing protocol, that includes the neighboring node, in response to the mobile ad hoc router determining that a determined variation in the relative proximity has reached a prescribed minimum interval of stable relative proximity,
    wherein the means for determining is configured for determining whether the determined variation in the relative proximity reaches the prescribed minimum interval of stable relative proximity based on determining the determined variation in the relative proximity, and determining whether the determined variation in the relative proximity has remained below a prescribed stability threshold for the prescribed minimum interval according to a prescribed minimum time interval.

10. The mobile ad hoc router of claim 9, further comprising means for receiving a neighbor discovery message including link metrics from the neighboring node, the means for determining configured for determining the relative proximity based on the link metrics.

11. The mobile ad hoc router of claim 10, wherein the relative proximity identifies an aggregate relative proximity of a plurality of mobile ad hoc routers within the mobile ad hoc network including said at least one neighboring node.

12. The mobile ad hoc router of claim 9, further comprising means for forwarding information describing the relative proximity to at least another neighboring node.

* * * * *